United States Patent
Perruchot et al.

(10) Patent No.: US 11,686,612 B2
(45) Date of Patent: Jun. 27, 2023

(54) DEVICE FOR DETECTING OPTICAL PULSES

(71) Applicant: THALES, Courbevoie (FR)

(72) Inventors: Ludovic Perruchot, Elancourt (FR); Thierry Midavaine, Elancourt (FR); Guillaume Bloom, Elancourt (FR); Jérôme Achart, Elancourt (FR); Marc Thillot, Elancourt (FR); Tugdual Perrot, Elancourt (FR); Vincent Ligeret, Elancourt (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 17/627,435

(22) PCT Filed: Jul. 13, 2020

(86) PCT No.: PCT/EP2020/069754
§ 371 (c)(1),
(2) Date: Jan. 14, 2022

(87) PCT Pub. No.: WO2021/009122
PCT Pub. Date: Jan. 21, 2021

(65) Prior Publication Data
US 2022/0260413 A1   Aug. 18, 2022

(30) Foreign Application Priority Data

Jul. 15, 2019   (FR) ..................... 19 07909

(51) Int. Cl.
*G01J 1/42*   (2006.01)
*G01J 1/44*   (2006.01)

(52) U.S. Cl.
CPC ......... *G01J 1/42* (2013.01); *G01J 2001/4238* (2013.01); *G01J 2001/446* (2013.01)

(58) Field of Classification Search
CPC . G01J 1/42; G01J 2001/4238; G01J 2001/446
See application file for complete search history.

(56) References Cited

U.S. PATENT DOCUMENTS

| 5,280,167 A | 1/1994 | Dubois |
| 8,004,665 B2 | 8/2011 | Cooley |
| (Continued) | | |

FOREIGN PATENT DOCUMENTS

| DE | 102016011913 A1 | 4/2018 |
| EP | 1361613 A1 | 11/2003 |
| EP | 2911092 A1 | 8/2015 |

OTHER PUBLICATIONS

French Search Report, from the French Patent Office in counterpart French Application No. FR 1907909, dated Apr. 21, 2020.

(Continued)

*Primary Examiner* — Tony Ko
(74) *Attorney, Agent, or Firm* — ArentFox Schiff LLP

(57) ABSTRACT

The present invention relates to an optical pulse detection device, the device comprising a sensor having a plurality of pixels, each pixel comprising:
  a receiver configured to receive optical pulses and generate an electrical signal,
  an event detection unit comprising a frequency filter having an adjustable cut-off frequency defining a passband for the event detection unit, the adjustable cut-off frequency being such that the upper bound of the passband is greater than or equal to 1 Megahertz, the detection unit being configured to detect variations in the electrical signal generated by the receiver only when the frequency in the frequency domain of said variations is within the passband of the event detection unit, and (Continued)

Figure 1:
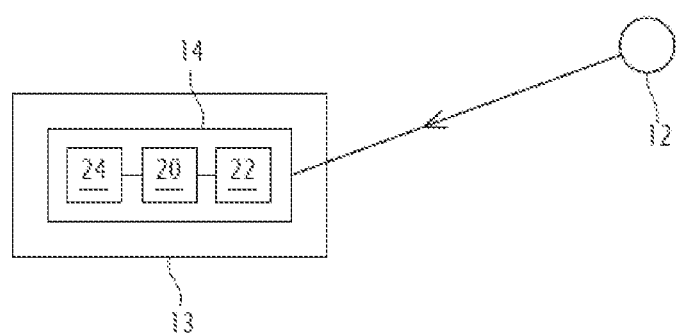

a timing unit configured to date each change in the electrical signal detected by the event detection unit.

17 Claims, 6 Drawing Sheets

(56) References Cited

U.S. PATENT DOCUMENTS

| | | |
|---|---|---|
| 9,310,490 B2 | 4/2016 | Abraham et al. |
| 9,733,121 B1 * | 8/2017 | Mitchell ............... G02B 27/106 |
| 2017/0370677 A1 | 12/2017 | Rutkiewicz et al. |
| 2019/0120689 A1 * | 4/2019 | Leem ................ H01L 27/14669 |

OTHER PUBLICATIONS

International Search Report and Written Opinion issued by the International Seach Authority in corresponding International Application No. PCT/EP2020/069754, dated Sep. 11, 2020.

* cited by examiner

DEVICE FOR DETECTING OPTICAL PULSES

CROSS-REFERENCE TO RELATED APPLICATIONS

The present Application for Patent is a National Stage Entry of International Application PCT/EP2020/069754, filed Jul. 13, 2020, which claims priority to French Patent Application No. 19 07909, filed Jul. 15, 2019. The disclosures of the priority applications are incorporated in their entirety by reference herein.

The present invention relates to a device for detecting optical pulses. The invention also concerns an optronic system comprising such a detection device.

Optronic systems are typically equipped with optical pulse detection functions, especially laser pulses.

The detection of laser pulses by means of such optronic systems is subject to many problems. In particular, one of the issues is to reduce the false alarm rate (caused, for example, by solar flares) while allowing accurate angular location of the emission source.

An existing solution is to use four-quadrant detectors that have a high bandwidth, which with appropriate filtering allows the detection of very short duration pulses, typically laser pulses, with slower events being rejected. However, such four-quadrant detectors have limited sensitivity due to daytime noise (especially for large fields) and have poor locating (outside the centre of the detector).

Another solution is to use imaging matrix detectors that have good locating (pixel position in the matrix). However, due to their long integration time (a few milliseconds), these detectors do not make it possible to distinguish between very short events (a few nanoseconds) caused by laser pulses and longer events caused by solar reflections, which generates many false alarms.

There is therefore a need for an optical pulse detection device that can reliably detect short-duration pulses, typically on the order of ten nanoseconds, while allowing precise angular location of the emission source.

To this end, the present description relates to a device for detecting optical pulses, advantageously laser pulses, each optical pulse having a pulse width, the device comprising a sensor having a plurality of pixels, each pixel comprising:
- a receiver configured to receive optical pulses and to generate an electrical signal having variations representative of the received optical pulses, each variation of the electrical signal having a frequency in the frequency domain dependent on the pulse width of the pulse corresponding to said variation,
- an event detection unit comprising at least one frequency filter, the or at least one frequency filter having at least one adjustable cut-off frequency, the cut-off frequency of each filter defining a passband for the event detection unit, the passband having a lower bound and an upper bound, the adjustable cut-off frequency of the or each filter being set so that the upper bound is greater than or equal to 1 Megahertz, the event detection unit being configured to detect over time variations in the electrical signal generated by the receiver only when the frequency in the frequency domain of said variations is within the passband of the event detection unit, and
- a timing unit configured to date each change in the electrical signal detected by the event detection unit.

In other beneficial aspects, the detection device comprises one or more of the following features, taken in isolation or in any technically possible combination:

- the or each adjustable cut-off frequency is adjusted in accordance with an adjustment voltage applied to the corresponding frequency filter, the adjustment being advantageously carried out during the design of the detection device;
- each event detection unit comprises at least one low-pass frequency filter with a first adjustable cut-off frequency and a high-pass frequency filter with a second adjustable cut-off frequency, the setting voltages applied to each filter being such that the first cut-off frequency is the upper bound of the passband of the event detection unit and the second cut-off frequency is the lower bound of the passband of the event detection unit;
- for each pixel, the adjustable cut-off frequency of the or each filter of the event detection unit is set so that the lower bound of the passband is greater than or equal to 100 kilohertz, preferably greater than or equal to 1 megahertz;
- the receiver is configured to generate an electrical signal only when the wavelength of the received optical pulses is between 380 nanometres and 1.7 micrometres;
- the device comprises at least one spectral filter upstream of the sensor, the spectral filter being centred on a wavelength of interest, advantageously the spectral filter having a transmission window of width greater than or equal to 30 nanometres or greater than or equal to 100 nanometres;
- each optical pulse is received on the sensor in the form of a spot, the device comprising a unit for controlling the size and shape of the spot so that the spot extends over at least two adjacent pixels of the sensor, advantageously over at least four adjacent pixels of the sensor, each pixel comprising a unit for measuring variations in the electrical signal detected by the corresponding event detection unit, the device further comprising a computer configured to, if necessary, compare the measurement taken by the measurement unit of each pixel over which the spot extends with a predetermined threshold and determine whether or not the received optical pulse is measurement noise depending on the result of the comparison;
- each optical pulse is received on the sensor as a spot, the device comprising a unit for controlling the size and shape of the spot so that the spot extends over at least two adjacent pixels of the sensor, advantageously over at least four adjacent pixels of the sensor, each pixel comprising a unit for measuring variations in the electrical signal detected by the corresponding event detection unit, the pixels of the sensor being grouped into sets, each set comprising at least a first pixel and a second pixel adjacent to the first pixel, each first pixel comprising an interference filter adapted to transmit only a first spectral band, the first spectral band being a spectral band of interest centred on a wavelength of interest, each second pixel comprising a filter adapted to transmit only a second spectral band, the second spectral band being different from the first spectral band, the second spectral band being a reference spectral band selected from the group consisting of:
  - a spectral band centred on a different wavelength from the or each wavelength of interest,
  - a spectral band disjoint from the or each spectral band of interest, and
  - a spectral band in which at least one spectral band of interest is strictly included, the device comprising a computer adapted to compare, if necessary, the measurements made by the measuring unit of each of the first and second pixels and to classify the received optical pulse according to the result of the comparison;

at least one wavelength of interest is between 1.05 microns and 1.07 microns or between 1.50 microns and 1.70 microns, preferably between 1.55 microns and 1.65 microns.

The invention also relates to an optronic system comprising a detection device as described above.

Figure 2:
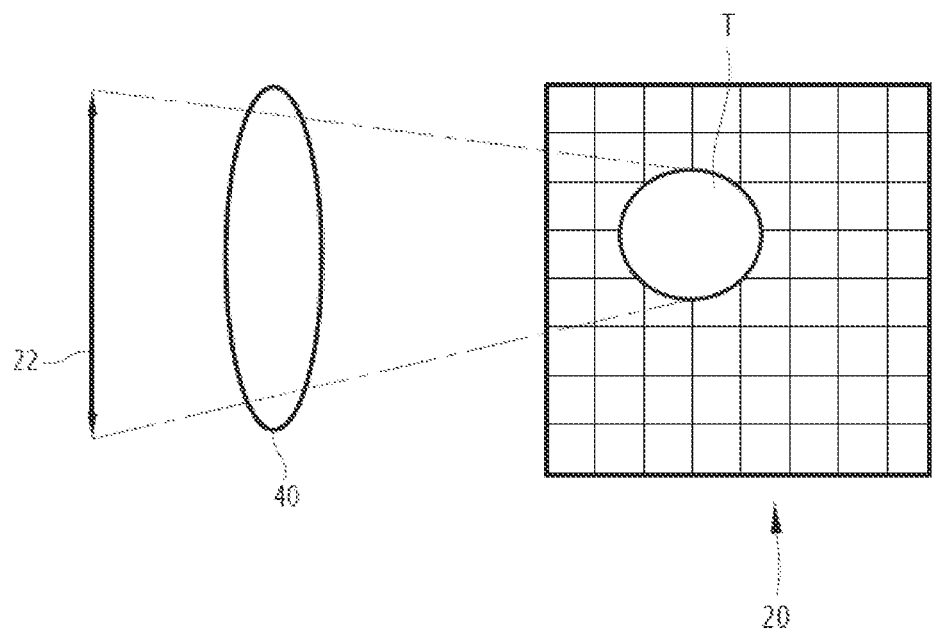
Figure 3:
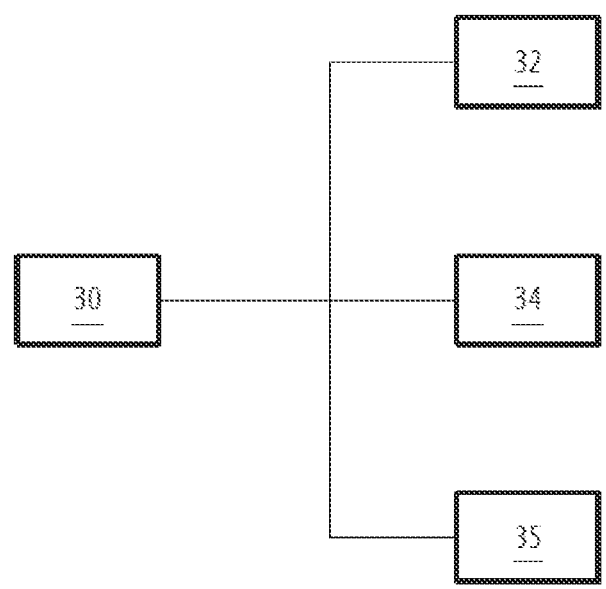
Figure 4:
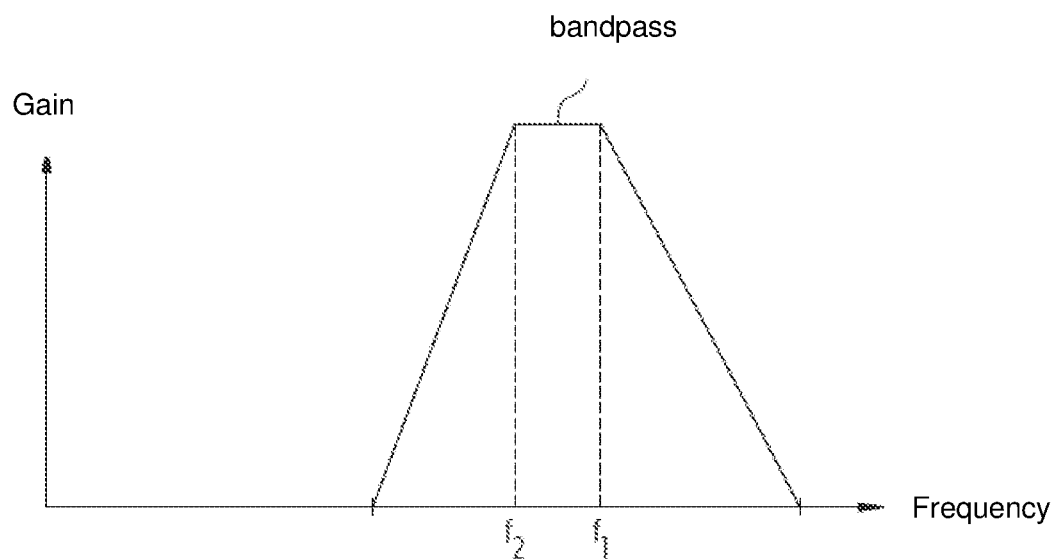
Figure 5:
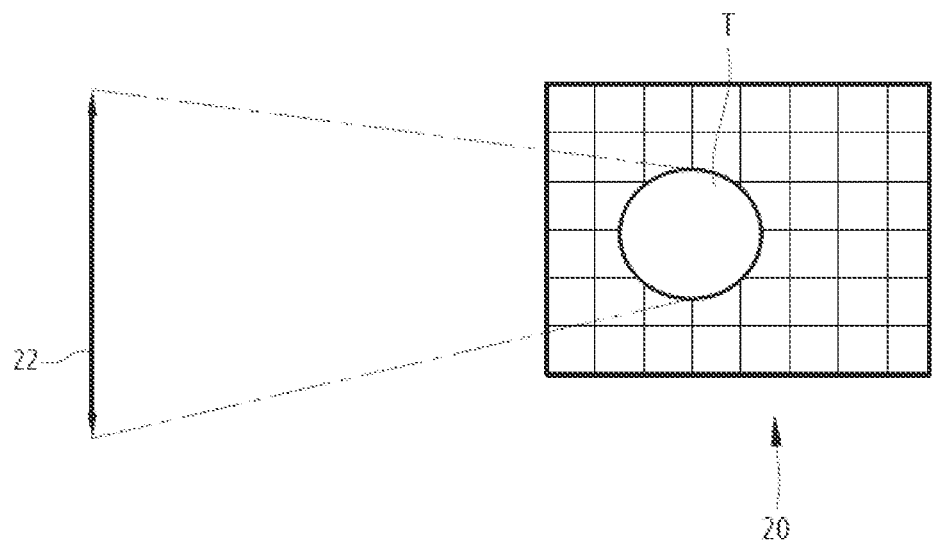
Figure 6:
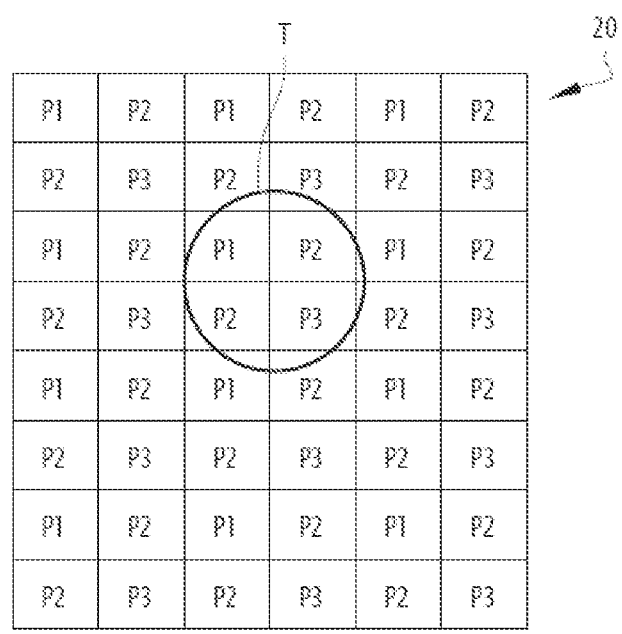

Other characteristics and advantages of the invention will become apparent upon reading the following description of embodiments of the invention, given only as an example and referencing the drawings, in which:

FIG. 1, a schematic representation of an example of a light source and optronic system comprising a detection device, FIG. 2, a schematic representation of an example of the elements of a detection device, namely: a sensor, a unit for controlling the size and shape of a spot on the sensor, and a spectral filter, FIG. 3, an example of a functional representation of the elements of a pixel of a sensor of a detection device, FIG. 4, an example of a Bode diagram of the frequency filters in FIG. 3 after applying setting voltages to the filters, FIG. 5, a schematic representation of an example of the elements of a detection device, namely: a sensor, a unit for controlling the size and shape of a spot on the sensor, and FIG. 6, a schematic representation of an example of a sensor of a detection device receiving an optical pulse in the form of a spot. FIG. 1 shows a light source 12 and an optronic system 13 comprising a detection device 14.

The light source 12 is suitable for emitting optical pulses in particular in the direction of the optronic system 13. The optical pulses emitted by the light source 12 have a spectral emission band BI. Each optical pulse has a pulse width (also called pulse duration). In the following, the term "optical pulse" is used to refer to pulses in the broadest sense, i.e. in the visible, infrared or ultraviolet range.

The light source 12 is, for example, a laser transmitter or a broadband source, such as the sun.

The optronic system 13 is configured to detect either directly or indirectly the optical pulses emitted in its direction.

The optronic system 13 is, for example, a laser range finder, pointer, laser designator, laser spot detector, laser pointer detector, laser warning detector, or beamrider system.

Advantageously, the optronic system 13 and the light source 12 operate in an outdoor environment on the same scene. A scene is a theatre of operations, i.e. the place where an action takes place. The scene is therefore an extended space with sufficient dimensions to allow an action to take place.

The optronic system 13 is, for example, intended to be integrated into a platform, such as an aircraft platform or a land vehicle.

In the example shown in FIG. 1, the detection device 14 comprises a sensor 20, a control module 22 and a computer 24.

The sensor 20 is suitable for receiving optical pulses, in particular optical pulses emitted by the light source 12. As can be seen in FIG. 2, the optical pulse is received at the sensor 20 as a spot T.

The sensor 20 is a matrix sensor, i.e. a sensor formed by a matrix of pixels. The pixel matrix is configured so that each signal is received on a number of pixels in the pixel matrix that is strictly less than the total number of pixels in the pixel matrix. Typically, each pixel in the matrix is associated with a direction. This allows the direction of each signal received by the pixel matrix to be determined.

Advantageously, the pixels of the sensor 20 are independent of each other. By the term "independent" it is understood that each pixel is configured to operate autonomously, regardless of the optical pulses received by the other pixels.

Advantageously, the sensor 20 is an event detection sensor. Such a sensor, conventionally used for video stream compression, has been adapted for optical pulse detection as described in the following.

As illustrated in FIG. 3, at least one pixel of the sensor 20 comprises a receiver 30, an event detection unit 32 and a timing unit 34. Preferably, each pixel of the sensor 20 comprises such a receiver 30, such an event detection unit 32 and such a timing unit 34, as illustrated in FIG. 3. Advantageously, each pixel of the sensor 20 further comprises a measuring unit 35 shown in FIG. 3.

The receiver 30 is configured to receive optical pulses and generate an electrical signal based on the received optical pulses. In particular, the electrical signal has variations representative of the optical pulses received. In particular, each variation of the electrical signal has a frequency in the frequency domain depending on the pulse width of the pulse corresponding to said variation. The term "frequency domain" is to be understood as opposed to "time domain", as the transition from a time domain signal to the corresponding frequency domain signal is done by applying a Fourier transform to the time domain signal. Thus, a signal in the frequency domain has a frequency or frequency distribution that depends on the width of the corresponding signal in the time domain. It will be understood that in this description the term "frequency in the frequency domain" is to be understood in a broad sense and may also refer to a frequency distribution. Furthermore, it will also be understood that the variations considered in the electrical signal are the variations corresponding to optical pulses.

The receiver 30 is, for example, a photodiode.

Preferably, the receiver 30 is configured to generate an electrical signal only when the wavelength of the received optical pulses is between 1 micron and 1.7 microns. The receiver 30 is in such a case adapted to detect such wavelengths. Indeed, for some detection applications, the wavelengths of interest are:

between 1.05 µm and 1.07 µm, advantageously equal to 1.064 µm, and/or between 1.50 µm and 1.70 µm, preferably between 1.55 µm and 1.65 µm.

The event detection unit 32 is configured to detect a change in the electrical signal generated by the receiver 30. A variation means that the corresponding pixel is illuminated at the present time (time of reception) differently from the previous time. Such a variation can be explained by the reception of an optical pulse from a laser on the sensor 20.

The variation is detectable only when the frequency in the frequency domain of said variations is within the bandwidth of the event detection unit 32. The bandwidth of the detection unit 32 comprises a lower bound (in frequency) and an upper bound (in frequency), the lower bound being strictly lower than the upper bound.

The event detection unit 32 comprises at least one frequency filter. The term "frequency filter" refers to a filter configured to filter a signal as a function of the frequency of that signal in the frequency domain.

Each frequency filter is preferably an analogue filter.

At least one frequency filter has at least one adjustable cut-off frequency. By the term "adjustable", it is understood that the cut-off frequency is changeable, the adjustment being made either during the design of the detection device 14 (in which case, once the adjustment has been made, it is no longer changeable) or during the use of the detection device 14 (in which case the adjustment can be made several times over time). The adjustable cut-off frequency is, for example, set according to a setting voltage applied to the filter. The cut-off frequency of each filter defines the bandwidth of the event detection unit 32.

Advantageously, the setting voltage, also called bias voltage, applied to each filter is such that the upper bound of the passband of the detection unit 32 is greater than or equal to 1 Megahertz (MHz), preferably greater than or equal to 10 MHz (while remaining below the upper bound). The detection unit 32 is then adapted to detect variations in the electrical signal corresponding to short optical pulses, typically in the order of ten nanoseconds.

Preferably, the setting voltage applied to each filter is such that the lower limit of the passband of the detection unit 32 is greater than or equal to 100 kilohertz (kHz), preferably greater than or equal to 1 MHz. The detection unit 32 is then adapted not to detect variations in the electrical signal corresponding to relatively long pulses, typically longer than a microsecond.

Preferably, the setting voltage applied to each filter is such that the bandwidth of the event detection unit 32 extends to at most 10 MHz.

Thus, the event detection unit 32 is configured to detect variations in the electrical signal corresponding to short pulses, typically of the order of ten nanoseconds, without taking into account pulses of longer duration, typically greater than one microsecond.

In the example shown in FIG. 4, each event detection unit 32 comprises at least one low-pass frequency filter with a first adjustable cut-off frequency f1 and a high-pass frequency filter with a second adjustable cut-off frequency f2.

In a typical operation of the event detection unit 32 for a video stream compression application, the setting voltages applied to each filter are such that the first cut-off frequency f1 is strictly higher than the second cut-off frequency f2. The first cut-off frequency f1 is typically in the order of ten kilohertz. The second cut-off frequency f2 is of the order of a few Hz, typically 0 Hz. Such a detection unit 32 does not make it possible to detect variations in the electrical signal corresponding to short pulses, typically on the order of ten nanoseconds, without taking into account pulses of longer duration, typically greater than one microsecond.

In an operation adapted for the detection of optical pulses, in particular optical pulses in the range of ten nanoseconds, the setting voltages applied to each filter are such that the cut-off frequencies have been adapted for the detection of optical pulses. In particular, the first cut-off frequency f1 is strictly higher than the second cut-off frequency f2, which is illustrated in FIG. 4. The low-pass and high-pass frequency filters then form a bandpass frequency filter. The first cut-off frequency f1 is then the upper bound of the bandwidth of the event detection unit 32 and the second cut-off frequency f2 is the lower bound of the bandwidth of the event detection unit 32. In accordance with what has been explained above, the first cut-off frequency f1 is typically greater than or equal to 1 MHz, preferably greater than or equal to 10 MHz. The second cut-off frequency f2 is typically greater than or equal to 100 kHz, preferably greater than or equal to 1 MHz.

The timing unit 34 is configured to date each change in the electrical signal detected by the event detection unit 32. The timing unit therefore assigns to each detected variation the date of reception of the corresponding optical pulse. In the case of periodic optical pulses, this makes it possible to trace the repetition frequency of the optical pulses, and thus to deduce characteristics of the emission source.

The measurement unit 35 is configured to measure the electrical signal generated by the receiver 30 when a change has been detected by the event detection unit 32. Such a measurement is, for example, an illumination measurement.

The spot T size and shape control unit 22 is configured to control the size and shape of the spot T forming on the sensor 20 from the optical pulse emitted by the light source 12. Advantageously, the control unit 22 is configured so that the spot T extends over at least two adjacent pixels of the sensor 20, advantageously over at least four adjacent pixels of the sensor 20.

The control unit 22 is, for example, an optical device configured to defocus the light flux received by the sensor 20. The control unit 22 comprises, for example, an optical lens (as shown in FIG. 2) or an optical diffuser upstream of the sensor 20.

Optionally, as shown in FIG. 2, a spectral filter 40 is arranged upstream of the sensor pixels 20. The spectral filter 40 is, for example, arranged downstream of the control unit 20.

The spectral filter 40 is centred on a wavelength of interest, i.e. a wavelength that the detection device 14 is configured to detect. The wavelength of interest is typically the central wavelength of the laser spectral band that is sought to be detected.

The spectral filter 40 has, for example, a transmission window of width greater than or equal to 30 nanometres (typically for a 1.06 µm laser) or greater than or equal to 100 nanometres (typically for a 1.50 µm laser). The computer 24 is, for example, a processor. The computer 24 comprises, for example, a data processing unit, memories, a data carrier reader and a human/machine interface.

In the example shown in FIG. 1, the computer 24 is carried by the optronic system 12. Alternatively, the computer 24 is remote from the optronic system 12 and is installed in an entity that is, for example, on the ground. This makes it possible to offload the processing carried out by the computer 24 outside the optronic system 12.

For example, the computer 24 interacts with a computer program product that comprises an information carrier. The information medium is a medium readable by the computer 24, usually by the data processing unit of the computer 24. The readable medium is a medium adapted to store electronic instructions and capable of being coupled to a bus of a computer system. For example, the readable medium is a floppy disk, optical disk, CD-ROM, magneto-optical disk, ROM, RAM, EPROM, EEPROM, magnetic card or optical card. A computer program product comprising program instructions is stored on the information medium.

The computer program is loadable onto the data processing unit and is adapted to cause steps for processing the measurements taken by the pixels of the of the sensor 20 to be implemented when the computer program is implemented on the processing unit of the computer 24.

In another example, the computer 24 is implemented as one or more programmable logic components, such as Field-Programmable Gate Arrays (FPGAs), or as one or more dedicated integrated circuits, such as Application-Specific Integrated Circuits (ASICs). The computer 24 is in this case configured to implement the steps for processing the measurements taken by the pixels of the sensor 20 as will be described in the following.

The operation of the detection device 14 will now be described. Advantageously, such an operation takes place at every moment, i.e. in real time.

The sensor 20 receives optical pulses over time. Each optical pulse is received as a spot T on the sensor 20. Advantageously, the spot T is spread over at least two adjacent pixels, preferably over at least four adjacent pixels of the sensor 20 as illustrated in FIG. 2.

The receiver 30 of each pixel receiving the optical pulse generates an electrical signal that is a function of the received optical pulse. In particular, the electrical signal has a variation representative of the received optical pulse, the variation of the electrical signal having a frequency in the frequency domain dependent on the pulse width of the pulse corresponding to said variation.

The event detection unit 32 of each pixel receiving the optical pulse detects any variation in the electrical signal generated by the receiver 30 from the previous time when the frequency in the frequency domain of the electrical signal is within the bandwidth of the event detection unit 32.

When a change has been detected by the event detection unit 32, the corresponding timing unit 34 dates each change in the electrical signal detected by the event detection unit 32.

Optionally, the measurement unit 35 measures the detected signal variation.

Advantageously, the computer 24 receives the measurements taken by each pixel and compares them to a predetermined threshold. Depending on the result of the comparisons, the computer 24 classifies the optical pulse as measurement noise or not. For example, if the measurement value is below the predetermined threshold for a number of adjacent pixels greater than or equal to a predetermined number (e.g. four), the optical pulse is considered to be measurement noise. Otherwise, the optical pulse is considered to come from a light source. Typically, it is considered that an optical pulse, other than simple measurement noise, has been received at the sensor 20 when several adjacent pixels (e.g. 4) have exceeded the predetermined threshold simultaneously. The term "simultaneously" means within a constrained time window, typically in the order of microseconds.

In addition, based on the pixels of the sensor 20 that received the optical pulse, the computer 24 locates the emission source.

Thus, the detection device 14 described allows laser pulses to be detected and located. In particular, the detection device 14 is particularly suitable for detecting pulses of short duration (a few tens of ns) and with precise wavelengths (for example 1.06 µm or 1.55 µm). This is made possible by the high bandwidth of the event detection unit. Adapted filtering also allows detection to be focused on the wavelengths of interest.

In particular, the detection device 14 can detect laser pulses with a precise time stamp, allowing the pulse repetition frequency (including at very high rates) or a time code to be determined. The detection device 14 also allows the precise locating of the source of such laser pulses. The detection device 14 can also reject pulses that do not correspond to laser pulses, typically pulses of long duration (greater than one microsecond). Finally, the matrix sensor 20 of the detection device 14 is compatible with the generating of an image of the scene in which the location of the detected optical pulses would be embedded.

In particular, the detection unit 32 of each pixel (originally designed for video stream compression) has been configured to detect extremely short events (a few tens of nanoseconds) by modifying the values of the frequency filters of the detection unit 32 (notably high-pass and low-pass).

The size and shape control unit of the spot T makes it possible to retain only those events for which several contiguous pixels (typically 4) have exceeded the predetermined threshold simultaneously within a constrained time window. This further reduces false events and distinguishes false events generated by detector noise (intrinsically isolated spatially and temporally).

Thus, the detection device 14 can reliably detect short duration pulses, in particular lasers, and locate them precisely while rejecting potential sources of false alarm (such as solar reflections, for example) on the basis of temporal criteria (in particular when the duration of the pulses is different from the desired duration).

A second embodiment of the detection device 14, complementary to the previously described embodiment (first embodiment), is described with reference to FIGS. 5 and 6. The elements identical to the detection device 14 according to the first embodiment are not repeated. Only differences are highlighted.

The pixels of the sensor 20 are grouped into sets. Each set preferably comprises the same number of pixels.

Each set comprises at least a first pixel P1 and a second pixel P2. The second pixel P2 is adjacent to the first pixel P1.

Each first pixel P1 comprises an interference filter suitable for transmitting only a first spectral band B1. An interference filter (also called a dichroic filter) is a filter whose transmission and reflection properties depend on the wavelength. The interference filter is, for example, of the Fabry Perot type.

The first spectral band B1 is a spectral band of interest centred on a wavelength of interest. The wavelength of interest is typically the central wavelength of the laser spectral band that is sought to be detected.

For example, the wavelength of interest is in the short infrared, i.e. the range of wavelengths between 0.9 micrometres (µm) and 1.7 µm. More precisely, the wavelength of interest is between 1.05 µm and 1.07 µm and is advantageously equal to 1.064 µm. In another example, the wavelength of interest is between 1.50 µm and 1.70 µm, preferably between 1.55 µm and 1.65 µm.

Each second pixel P2 comprises a filter suitable for transmitting only a second spectral band B2. The filter of the second pixel P2 is, for example, a high-pass filter.

The second spectral band B2 is different from the first spectral band B1. The second spectral band B2 is a reference spectral band. A reference spectral band allows a local or near-field illumination reference to be defined for each set of pixels. The reference spectral band is selected from the group consisting of:
  (i): a spectral band centred on a different wavelength from the or each wavelength of interest,
  (ii): a spectral band disjoint from the or each spectral band of interest, and
  (iii): a spectral band in which at least one spectral band of interest is strictly included.

Preferably, when the reference spectral band is of type (iii), the reference spectral band is a broad spectral band. A broad spectral band is defined as a spectral band with a width greater than or equal to 100 nm. When the reference spectral band is of type (i) or (ii), the reference spectral band is either a broad spectral band or a narrow spectral band. A narrow spectral band is defined as a spectral band less than 100 nanometres (nm) wide.

Advantageously, each set comprises at least a third pixel P3 among the plurality of pixels of the sensor 20. The third pixel P3 is adjacent to at least one of the first or second pixel P2 in the set.

Each third pixel P3 comprises a filter suitable for transmitting only a third spectral band B3.

The third spectral band B3 is different from the first spectral band B1 and the second spectral band B2. The third spectral band B3 is a spectral band of interest centred on a wavelength of interest.

Alternatively, the third spectral band B3 is a reference spectral band different from the second spectral band B2.

Advantageously, when the third spectral band B3 is a spectral band of interest, the filter of the third pixel P3 is an interference filter.

Advantageously, each set comprises a plurality of pixels, such as several first pixels P1 and/or several second pixels P2 and/or several third pixels P3 and/or pixels different from the first, second and third pixels P1, P2, P3. In this case, each pixel comprises a filter adapted to the spectral band corresponding to the pixel. Where each set comprises pixels different from the first, second and third pixels P1, P2, P3, the spectral bands of said pixels P1, P2, P3 are spectral bands of interest or reference spectral bands.

The arrangement of the pixels in each set is predefined. Advantageously, the arrangement of the pixels in each set is predefined and is advantageously identical from one set to another. For example, the position of the different types of pixels on the sensor 20 is chosen to form a periodic pattern. Advantageously, the different types of pixels are arranged in an interlaced pattern.

For example, the positions of the first pixels on the sensor 20 are chosen to form a predefined pattern (e.g. a staggered pattern) and the position of the other pixels, in particular the second pixels, are the positions not occupied by the first pixels (in the example, the gaps in the staggered pattern).

An example of the arrangement of the first, second and third pixels P1, P2, P3 is shown in FIG. 6. In this example, second pixels P2 (reference pixels) are arranged in a periodic pattern on the sensor 20 and first pixels P1 (pixel of interest) and third pixels P3 (pixels of interest or reference) are arranged periodically in the spaces not occupied by the first pixels.

The computer 24 is adapted to compare, if necessary, the measurements taken by the pixels of each set and to classify the optical pulse based on the result of the comparison. For example, the results of the comparison are compared with a database of results for known light sources, allowing the classification of the light source to be identified.

Comparisons are, for example, made on a detection-by-detection basis, i.e. each time a flux is received on the sensor 20.

Alternatively, comparisons are made after several detections, for example after a period of time longer than the duration of a laser shot (on the order of 1 second at most). This makes it easier to classify the light source 11.

The operation of the detection device 14 in the second embodiment will now be described. In the following, only the differences in the operation of the detection device 14 compared to the first embodiment are highlighted.

The sensor 20 receives an optical pulse in the form of a spot T spread over at least one set of pixels of the sensor 20.

In response, the measurement unit 35 of each pixel in the set receiving the optical pulse generates a measurement (assuming that a change has been detected by the detection unit 32 of each pixel).

The computer 24 then compares the measurements to a predetermined threshold in a manner similar to the first mode of operation.

Measurements that are deemed valid (i.e. as corresponding to optical pulses different from mere noise) are then compared between pixels in the same set. To do this, the computer 24 calculates ratios between the measurements of each set and then compares the ratios obtained to at least one predetermined value to classify the emitting light source 11.

In this example, the computer 24 compares the measurements of the first, second and third pixels P1, P2, P3 of the set of illuminated pixels.

For example, the computer 24 calculates the ratios between the measurements obtained for the first, second and third pixels P1, P2, P3, which is equivalent to calculating the ratios between the first, second and third spectral bands B1, B2, B3. For example, when the first and third spectral bands B1, B3 are spectral bands of interest and the second spectral band B2 is a reference spectral band, the ratios calculated are, on the one hand, the ratio B1/B2 between the first spectral band B1 (of interest) and the second spectral band B2 (of reference) and, on the other hand, the ratio B3/B2 between the third spectral band B3 (of interest) and the second spectral band B2 (of reference).

These ratios are then compared to predetermined values, which determine whether the emission source is a laser source centred on the wavelength of interest or a broadband source. Advantageously, the estimation of the equivalent temperature of the light source 11 allows a more accurate classification of the source. For example, equivalent temperatures of around 5800 Kelvins (K) will reject a solar reflection. Temperatures below 2000 K will allow the classification of muzzle fires or rocket or missile propulsion.

In one embodiment, the measuring unit 35 does not allow for the measurement of flux variations. This is particularly the case when the pulse received is very short. In this case, in response to the receipt of an optical pulse, knowledge of the pixels that detected the optical pulse allows the emission source to be classified. For example, when each of the pixels of interest (P1, P3) and reference (P2) in a set has detected an optical pulse, the emission is considered to be from a solar reflection. When only the first pixel of interest P1 and the reference pixel P2 of a set have detected an optical pulse, the emission is considered to be from a laser source centred on a wavelength within the first spectral band B1. When only the third pixel of interest P3 and the reference pixel P2 in a set have detected an optical pulse, the emission is considered to be from a laser source centred on a wavelength within the third spectral band B3.

Thus, in addition to the advantages of the first embodiment, the detection device 14 according to the second embodiment makes it possible, by comparing ratios, or more simply by comparing the pixels of a set that has carried out a detection, to distinguish laser emissions (particularly in the short infrared) from solar reflections, which makes it possible to reduce the rate of false alarms. In particular, in the case of a matrix laser warning detector, the false alarm rate is reduced for the detection of laser streams emitted by, for example, multi-pulse rangefinders, laser designators, active imager illuminators, or the like.

As the sensor 20 of the detection device 14 is a matrix sensor, the precise angular localisation of the emission source is also possible. In addition, such a matrix sensor can perform two functions: a detection function (to classify the emission source) and an imaging function.

In addition, the pixels corresponding to the reference spectral bands allow a local scene illumination reference to be defined. In particular, during the day, the average solar flux reflected from the scene is taken into account.

Thus, the detection device 14 can reliably detect short duration pulses, in particular lasers, and locate them precisely while rejecting potential sources of false alarm (such as solar reflections, for example) on the basis of temporal criteria (in particular when the duration of the pulses is different from the desired duration).

The skilled person will appreciate that the above-described embodiments can be combined to form new embodiments, provided that they are technically compatible.

The invention claimed is:

1. A device for detecting optical pulses, each optical pulse having a pulse width, the device comprising a sensor having a plurality of pixels, each pixel comprising:
   a receiver configured to receive optical pulses and to generate an electrical signal having variations representative of the received optical pulses, each variation of the electrical signal having a frequency in the frequency domain dependent on the pulse width of the pulse corresponding to said variation,
   an event detection unit comprising at least one frequency filter, the or at least one frequency filter having at least one adjustable cut-off frequency, the cut-off frequency of each filter defining a passband for the event detection unit, the passband having a lower bound and an upper bound, the adjustable cut-off frequency of the or each filter being set so that the upper bound is greater than or equal to 1 Megahertz, the event detection unit being configured to detect over time variations in the electrical signal generated by the receiver only when the frequency in the frequency domain of said variations is within the passband of the event detection unit, and
   a timing unit configured to date each change in the electrical signal detected by the event detection unit.

2. The device according to claim 1, wherein the device is a device for detecting laser pulses.

3. The device according to claim 1, wherein the or each adjustable cut-off frequency is adjusted in accordance with an adjustment voltage applied to the corresponding frequency filter.

4. The device according to claim 3, wherein the adjustment is advantageously carried out during the design of the detection device.

5. The device according to claim 3, wherein each event detection unit comprises at least one low-pass frequency filter with a first adjustable cut-off frequency and a high-pass frequency filter with a second adjustable cut-off frequency, the setting voltages applied to each filter being such that the first cut-off frequency is the upper bound of the passband of the event detection unit and the second cut-off frequency is the lower bound of the passband of the event detection unit.

6. The device according to claim 1, wherein, for each pixel, the adjustable cut-off frequency of the or each filter of the event detection unit is set so that the lower bound of the passband is greater than or equal to 100 kilohertz.

7. The device according to claim 1, wherein, for each pixel, the adjustable cut-off frequency of the or each filter of the event detection unit is set so that the lower bound of the passband is greater than or equal to 1 megahertz.

8. The device according to claim 1, wherein the receiver is configured to generate an electrical signal only when the wavelength of the received optical pulses is between 380 nanometres and 1.7 micrometres.

9. The device according to claim 1, wherein the device comprises at least one spectral filter upstream of the sensor, the spectral filter being centered on a wavelength of interest.

10. The device according to claim 9, wherein the spectral filter has a transmission window of width greater than or equal to 30 nanometres.

11. The device according to claim 9, wherein at least one wavelength of interest is between 1.55 microns and 1.65 microns.

12. The device according to claim 9, wherein the spectral filter has a transmission window of width greater than or equal to 100 nanometres.

13. The device according to claim 1, wherein each optical pulse is received on the sensor in the form of a spot, the device comprising a unit for controlling the size and shape of the spot so that the spot extends over at least two adjacent pixels of the sensor, each pixel comprising a unit for measuring variations in the electrical signal detected by the corresponding event detection unit, the device further comprising a computer configured to, if necessary, compare the measurement taken by the measurement unit of each pixel over which the spot extends with a predetermined threshold and determine whether or not the received optical pulse is measurement noise depending on the result of the comparison.

14. The device according to claim 1, wherein each optical pulse is received on the sensor as a spot, the device comprising a unit for controlling the size and shape of the spot so that the spot extends over at least two adjacent pixels of the sensor, each pixel comprising a unit for measuring variations in the electrical signal detected by the corresponding event detection unit, the pixels of the sensor being grouped into sets, each set comprising at least a first pixel and a second pixel adjacent to the first pixel, each first pixel comprising an interference filter adapted to transmit only a first spectral band, at least one spectral band of interest being defined, the first spectral band being a spectral band of interest, each spectral band of interest being centred on a wavelength of interest, each second pixel comprising a filter adapted to transmit only a second spectral band, the second spectral band being different from the first spectral band, the second spectral band being a reference spectral band selected from the group consisting of:
   a spectral band centred on a different wavelength from the or each wavelength of interest,
   a spectral band disjoint from the or each spectral band of interest, and
   a spectral band in which at least one spectral band of interest is strictly included, the device comprising a computer adapted to compare, if necessary, the measurements made by the measuring unit of each of the first and second pixels and to classify the received optical pulse according to the result of the comparison.

15. The device according to claim 13, wherein the unit for controlling the size and shape of the spot controls the size and shape of the spot so that the spot extends over at least four adjacent pixels of the sensor.

16. The device according to claim 14, wherein at least one wavelength of interest is between 1.05 microns and 1.07 microns.

17. An optronic system comprising a detection device according to claim 1.

* * * * *